United States Patent
Liu et al.

(10) Patent No.: US 11,455,931 B1
(45) Date of Patent: Sep. 27, 2022

(54) SOURCE DRIVING CIRCUIT FOR IMPROVING GAMMA VOLTAGE RESPONSE TIME AND DISPLAY DEVICE

(71) Applicant: Fitipower Integrated Technology, Inc., Hsinchu (TW)

(72) Inventors: Li-Wei Liu, Hsinchu (TW); Bo-Wen Huang, Hsinchu (TW); Chun-Yung Cho, Hsinchu (TW)

(73) Assignee: Fitipower Integrated Technology, Inc., Hsinchu (TW)

( * ) Notice: Subject to any disclaimer, the term of this patent is extended or adjusted under 35 U.S.C. 154(b) by 0 days.

(21) Appl. No.: 17/684,584

(22) Filed: Mar. 2, 2022

(30) Foreign Application Priority Data

Nov. 19, 2021 (CN) .......................... 202111374396.2

(51) Int. Cl.
*G09G 3/20* (2006.01)

(52) U.S. Cl.
CPC ....... *G09G 3/20* (2013.01); *G09G 2300/0828* (2013.01); *G09G 2310/027* (2013.01); *G09G 2310/0291* (2013.01); *G09G 2310/08* (2013.01); *G09G 2320/0276* (2013.01)

(58) Field of Classification Search
CPC ............. G09G 3/20; G09G 2300/0828; G09G 2310/027; G09G 2310/0291; G09G 2310/08; G09G 2320/0276
See application file for complete search history.

(56) References Cited

U.S. PATENT DOCUMENTS

| | | | | |
|---|---|---|---|---|
| 2015/0015618 A1* | 1/2015 | Song | ................... | G09G 3/3208 |
| | | | | 345/690 |
| 2015/0310835 A1* | 10/2015 | Lee | ...................... | G09G 3/2003 |
| | | | | 345/213 |
| 2015/0332638 A1* | 11/2015 | Li | ......................... | G09G 3/3696 |
| | | | | 345/214 |
| 2017/0046993 A1* | 2/2017 | Chang | .................. | G09G 3/2003 |
| 2018/0226034 A1* | 8/2018 | Takahashi | ............... | G09G 3/20 |
| 2019/0180702 A1* | 6/2019 | Kim | ..................... | G09G 3/2003 |
| 2020/0380904 A1* | 12/2020 | Yeh | ...................... | G09G 3/3696 |

* cited by examiner

*Primary Examiner* — Andrew Sasinowski
(74) *Attorney, Agent, or Firm* — ScienBiziP, P.C.

(57) ABSTRACT

A source driving circuit of a display includes a gamma resistor strings, a digital to analog (DAC) circuit, and an output buffer circuit. The output buffer circuit includes input stage module, gain stage module, and output stage module. The input stage module includes main input stage unit and auxiliary input stage unit. Sizes of elements in main input stage unit are larger than sizes of elements in the auxiliary input stage unit, smaller sizes presenting smaller parasitic capacitances. During the switching period, the auxiliary input stage unit, gain stage module, and output stage module form a first unity gain amplifier outputting the driving voltages. During the stable period, the main input stage unit, gain stage module, and output stage module form a second unity gain amplifier outputting the driving voltages. A display device is also disclosed.

20 Claims, 7 Drawing Sheets

SOURCE DRIVING CIRCUIT FOR IMPROVING GAMMA VOLTAGE RESPONSE TIME AND DISPLAY DEVICE

FIELD

The subject matter herein generally relates to displays, specifically to a source driving circuit for improving gamma voltage response time and a display device.

BACKGROUND

Displays are widely used in mobile phone, notebook, personal digital assistant (PAD), tablet, media player, and the like. The display includes a display panel and a driving circuit for driving the display panel. The display includes a plurality of pixel units. The driving circuit includes a timing control circuit, a gamma correction reference voltage circuit, a gate driving circuit, and a source driving circuit. The source driving circuit includes gamma resistor strings, a digital to analog converter (DAC), and an output buffer circuit. The DAC receives digital image data and converts it into analog voltages based on the gamma voltage provided by the gamma resistor strings, and the output buffer circuit outputs the analog voltages to the pixel units. When the timing control circuit transmits the image data to the source driving circuit, the DAC selects a corresponding gamma voltage in the gamma resistor strings based on the image data being received. The received image data are converted into analog signals (gamma voltage) and are transmitted to the output buffer circuit. When the display panel displays images, the timing control circuit continuously transmits and updates image data to the source driving circuit according to the change of the displayed images. The DAC selects and updates the gamma voltages based on the received image data. In response to different image data, the gamma correction reference voltage circuit charges or discharges an input terminal of the output buffer circuit. Due to parasitic capacitances and parasitic resistances in the source driving circuit, a transmission delay of the gamma voltages occurs, which affects the output slew rate of the output buffer circuit.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure.

It will be understood that the specific embodiments described herein are merely some embodiments and not all.

Unless otherwise defined, meanings of all technical and scientific terms used in this specification are the same as that usually understood by a person skilled in the art to which the present disclosure belongs. In the present disclosure, terms used in the specification of the present disclosure are merely intended to describe objectives of the specific embodiments, but are not intended to limit the present disclosure.

Figure 1:
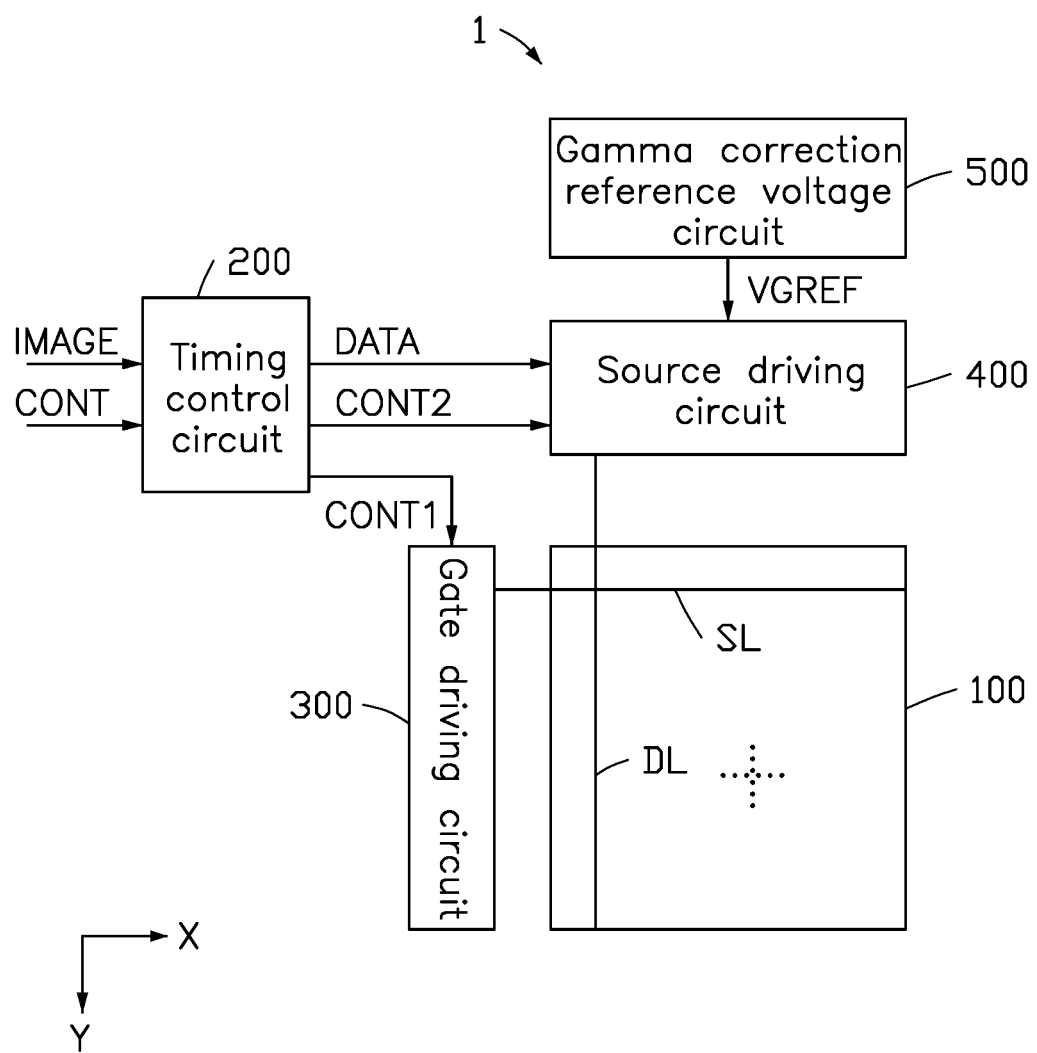
FIG. 1 is a diagram illustrating an embodiment of a display device according to the present disclosure.

FIG. 1 shows a display device 1. The display device 1 includes a display panel 100 disposed in a display region, a timing control circuit 200, a gate driving circuit 300, a source driving circuit 400, and a gamma correction reference voltage circuit 500. The timing control circuit 200, the gate driving circuit 300, the source driving circuit 400, and the gamma correction reference voltage circuit 500 are disposed in a non-display region.

The display panel 100 includes a plurality of scan lines SLs and a plurality of data lines DLs. The scan lines SLs are parallel with each other along a first direction X, and the data lines DLs are parallel with each other along a second direction Y. The scan lines SLs and the data lines DLs are insulated and cross each other to define a plurality of pixel units (not shown). In one embodiment, the first direction X is perpendicular to the second direction Y. In other embodiments, the first direction X can intersect with the second direction Y in another angle. The pixel units in one line are electrically connected to the gate driving circuit 300 through one scan line SL, and the pixel units in one column are electrically connected to the source driving circuit 400 through one data line DL. The timing control circuit 200 is electrically connected to the gate driving circuit 300 and the source driving circuit 400. Based on an input control signal CONT, the timing control circuit 200 generates a first control signal CONT1, and sends the first control signal CONT1 to the gate driving circuit 300. Based on an image data IMAGE, the timing control circuit 200 generates data signal DATA and a second control signal CONT2, and sends the data signal DATA and the second control signal CONT2 to the source driving circuit 400. The control signals can include periodic control signals and non-periodic control signals. The control signals can include a vertical synchronizing signal, a horizontal synchronizing signal, and data enable signal. The gate driving circuit 300 provides scan signals to the scan lines SL for scanning the pixel units, and the source driving circuit 400 converts the data signal DATA into driving voltages and provides the driving voltages to the data lines DLs for controlling the pixel units, so as to display images. The gamma correction reference voltage circuit 500 outputs gamma correction reference voltages based on a gamma correction curve.

Figure 2:
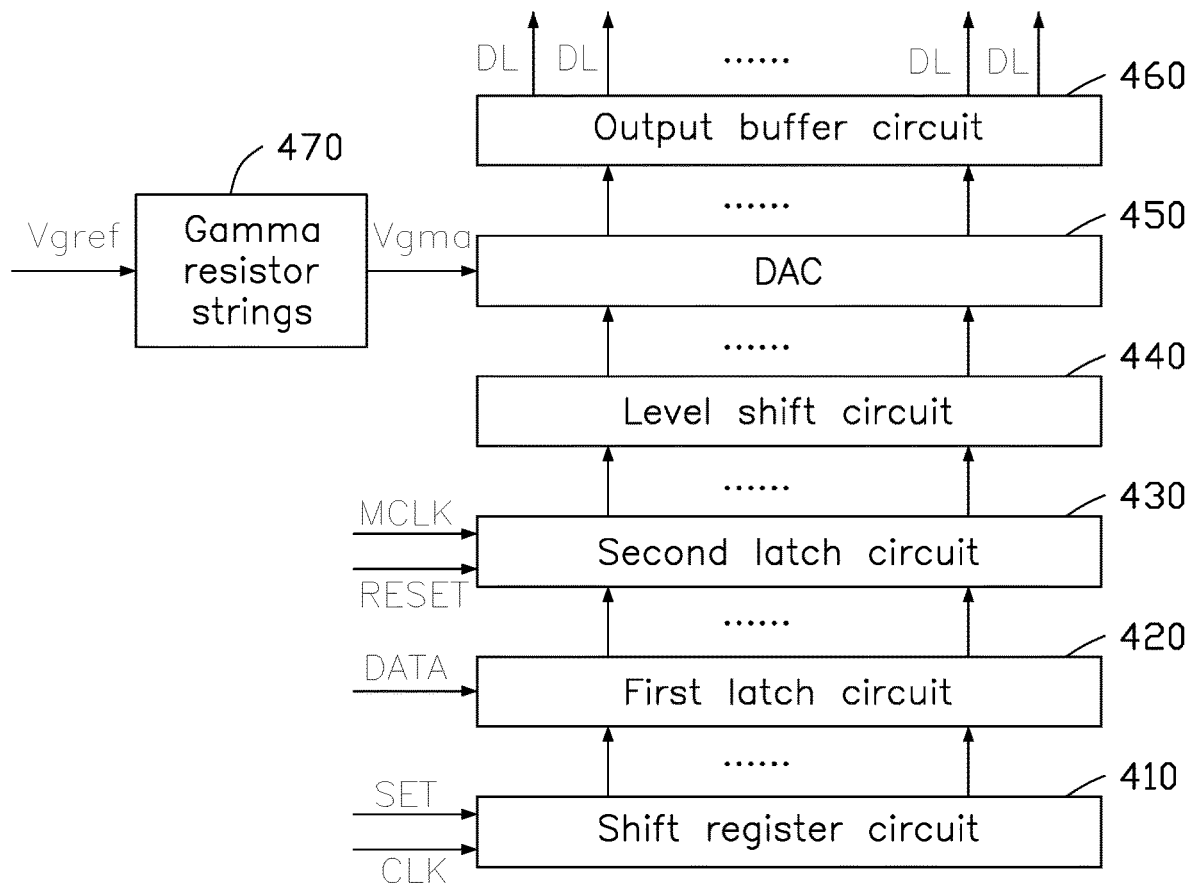
FIG. 2 is a diagram illustrating an embodiment of a source driving circuit of the display device of FIG. 1 according to the present disclosure.

FIG. 2 shows the source driving circuit 400. The source driving circuit 400 includes a shift register circuit 410, a first latch circuit 420, a second latch circuit 430, a level shift circuit 440, a digital to analog converter (DAC) circuit 450, an output buffer circuit 460, and gamma resistor strings 470.

The shift register circuit 410 receives a setting signal SET and a first clock signal CLK from the timing control circuit 200. The shift register circuit 410 generates a sample pulse signal.

The first latch circuit 420 is electrically connected to the shift register circuit 410. The first latch circuit 420 receives the data signal DATA provided by the timing control circuit 200 and the sample pulse signal generated by the shift register circuit 410. The first latch circuit 420 samples the data signal DATA based on the sample pulse signal to obtain a sampled signal.

The second latch circuit 430 is electrically connected to the first latch circuit 420 and the timing control circuit 200. The second latch circuit 430 receives a second clock signal MCLK and a resetting signal RESET from the timing control circuit 200. The second latch circuit 430 latches the sampled signal based on the second clock signal MCLK and the resetting signal RESET.

The level shift circuit 440 is electrically connected with the second latch circuit 430. The level shift circuit 440 modulates an amplitude of the sampled signal.

The DAC circuit 450 is electrically connected to the level shift circuit 440 and the gamma resistor strings 470. The DAC circuit 450 selects a gamma voltage in the gamma resistor strings 470 based on the modulated sampled signal, and outputs the gamma voltage to the output buffer circuit 460.

The output buffer circuit 460 is electrically connected to the DAC circuit 450 and the data lines DLs. The output buffer circuit 460 receives the gamma voltage and outputs a driving voltage to each of the data lines DLs. The output buffer circuit 460 operates under a switching period T1 and a stable period T2, alternately. During the switching period T1, the output buffer circuit 460 quickly responds to the driving voltage selected by the DAC circuit 450. During the stable period T2, the output buffer circuit 460 outputs the selected driving voltage to the data line DL.

Figure 3:
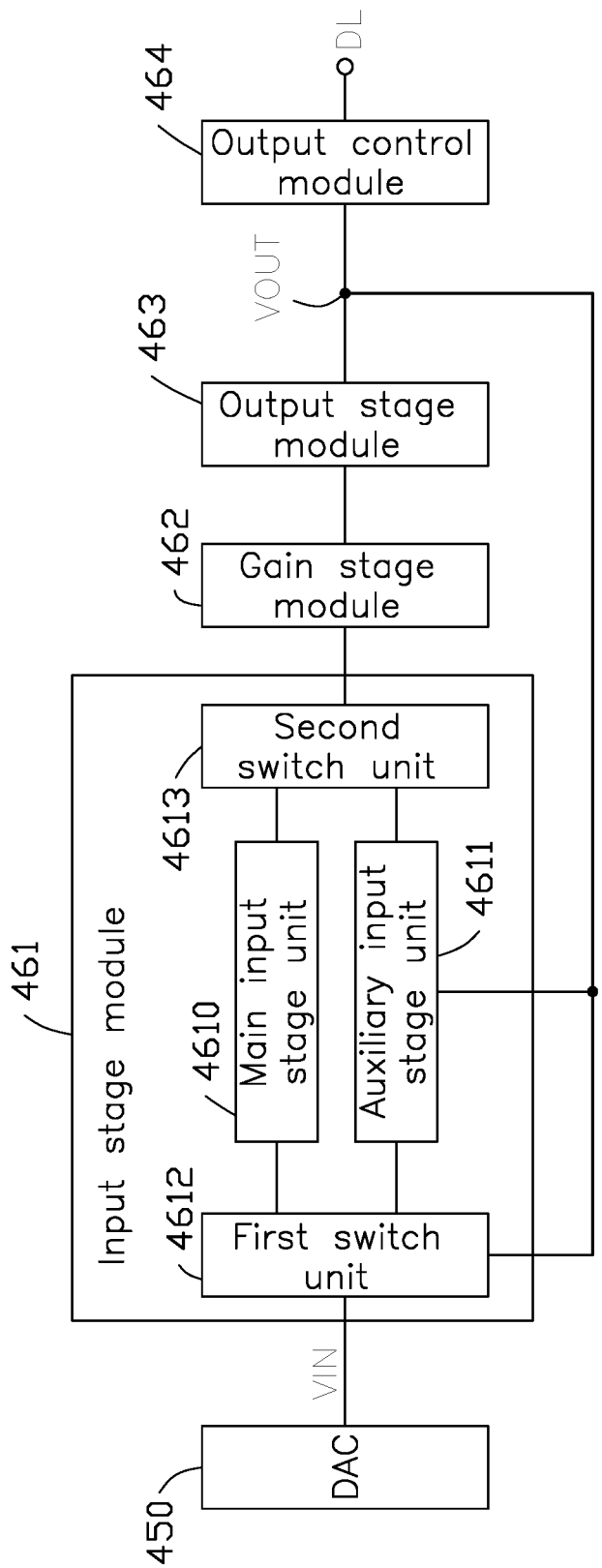
FIG. 3 is a diagram illustrating a first embodiment of an output buffer circuit of the circuit of FIG. 2 according to the present disclosure

FIG. 3 shows the output buffer circuit 460. The output buffer circuit 460 includes an input stage module 461, a gain stage module 462, an output stage module 463, and an output control module 464.

The input stage module 461 is electrically connected between the DAC circuit 450 and the gain stage module 462. The input stage module 461 buffers the driving voltage. The input stage module 461 includes a main input stage unit 4610, an auxiliary input stage unit 4611, a first switch unit 4612, and a second switch unit 4613.

Figure 4:
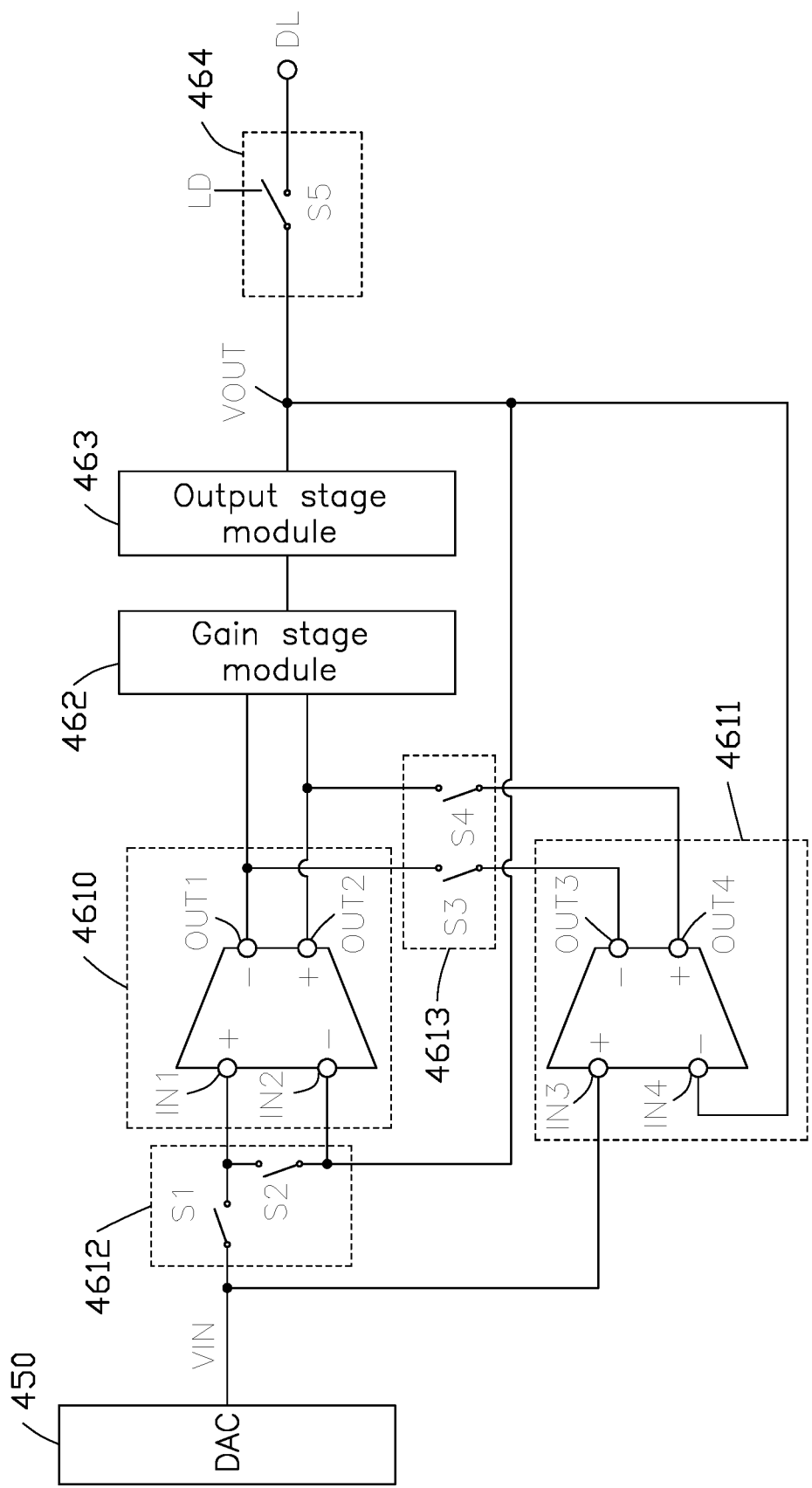
FIG. 4 is a circuit diagram illustrating an embodiment of an input stage module and an output control module of the circuit of FIG. 3 according to the present disclosure.

FIG. 4 shows the input stage module 461 and the output control module 464. The main input stage unit 4610 is electrically connected to the DAC circuit 450 through the first switch unit 4612. The main input stage unit 4610 converts the received gamma voltage into a differential current and outputs the differential current to the gain stage module 462 during the stable period T2. The main input stage unit 4610 can be a differential input pair circuit. Sizes of elements in the main input stage unit 4610 are N times larger than sizes of elements in the auxiliary input stage unit 4611. N can be an integer or non-integer. In one embodiment, the sizes of the elements in the main input stage unit 4610 are 3 times larger than the sizes of the elements in the auxiliary input stage unit 4611. In other embodiments, the sizes of the elements in the main input stage unit 4610 can be 40 or more than 40 times larger than the sizes of the elements in the auxiliary input stage unit 4611. The main input stage unit 4610 includes a first input terminal IN1, a second input terminal IN2, a first output terminal OUT1, and a second output terminal OUT2. In one embodiment, the first input terminal IN1 is a positive terminal, and the second input terminal IN2 is a negative terminal. The first output terminal OUT1 is a negative terminal and the second output terminal OUT2 is a positive terminal.

The auxiliary input stage unit 4611 is electrically connected to the gain stage module 462 through the second switch unit 4613. The auxiliary input stage unit 4611 having smaller parasitic capacitance converts the received gamma voltage into a differential current and outputs the differential current to the gain stage module 462 during the switching period T1. The auxiliary input stage unit 4611 can be a differential input pair circuit. The auxiliary input stage unit 4611 includes a third input terminal IN3, a fourth input terminal IN4, a third output terminal OUT3, and a fourth output terminal OUT4. In one embodiment, the third input terminal IN3 is a positive terminal, the fourth input terminal IN4 is a negative terminal, the third output terminal OUT3 is a negative terminal, and the further output terminal OUT4 is a positive terminal.

The first switch unit 4612 is electrically connected to the DAC circuit 450 and the main input stage unit 4610. The first switch unit 4612 controls the main input stage unit 4610 to be electrically connected with the DAC circuit 450. During the switching period T1, the first switch unit 4612 cuts off an electrical connection between the main input stage unit 4610 and the DAC circuit 450, and controls the first input terminal IN1 to be electrically connected with the second input terminal IN2 and an output terminal VOUT of the output stage module 463. During the stable period T2, the first switch unit 4612 establishes an electrical connection between the main input stage unit 4610 and the DAC circuit 450, and controls the first input terminal IN1 to be electrically disconnected from the second input terminal IN2. The first switch unit 4612 includes a first switch S1 and a second switch S2. A terminal of the first switch S1 is electrically connected to the DAC circuit 450 through an input terminal VIN, and another terminal of the first switch S1 is electrically connected to the first input terminal IN1 of the main input stage unit 4610. A terminal of the second switch S2 is electrically connected to the first input terminal IN1 of the main input stage unit 4610, and another terminal of the second switch S2 is electrically connected to the second input terminal IN2 of the main input stage unit 4610. The first switch S1 is controlled by a first switch control signal, and the second switch S2 is controlled by a second switch control signal. The first switch control signal and the second switch control signal are pulse signals. Pulse widths of the first switch control signal and the second switch control signal can be adjusted according to a required settling time of the voltage at an output terminal VOUT of the output stage module 463. At any point in time, voltage levels of the first switch control signal and the second switch control signal are opposite. When the first switch control signal is in an active state (on state), the second switch control signal is in an inactive state (off state). When the first switch control signal is in the inactive state, the second switch control signal is in the active state. In one embodiment, the first switch S1 and the second switch S2 are electric switches. In other embodiments, the first switch S1 and second switch S2 can be transistors.

The second switch unit 4613 is electrically connected between the auxiliary input stage unit 4611 and the gain stage module 462. During the switching period T1, the second switch unit 4613 establishes an electrical connection between the auxiliary input stage unit 4611 and the gain stage module 462. During the stable period T2, the second switch unit 4613 cuts off the electrical connection between the auxiliary input stage unit 4611 and the gain stage module 462. The second switch unit 4613 includes a third switch S3 and a fourth switch S4. A terminal of the third switch S3 is electrically connected to the third output terminal OUT3 of the auxiliary input stage unit 4611, and another terminal of the third switch S3 is electrically connected to the gain stage module 462. A terminal of the fourth switch S4 is electrically connected to the fourth output terminal OUT4, and another terminal of the fourth switch S4 is electrically connected to the gain stage module 462. The third switch S3 and the fourth switch S4 are controlled by the second switch control signal. In one embodiment, the third switch S3 and the fourth switch S4 are electric switches. In other embodiments, the third switch S3 and the fourth switch S4 can be transistors.

The gain stage module 462 is electrically connected to the input stage module 461 and the output stage module 463. The gain stage module 462 converts the differential current into voltage and outputs the voltage to the output stage module 463. The gain stage module 462 can be an active load circuit.

The output terminal VOUT of the output stage module 463 is electrically connected to the data line DL through the output control module 464, and is electrically connected to the main input stage module 461. During the switching period T1, the output stage module 463 discharges or charges the main input stage unit 4610. During the stable period T2, the output stage module 463 outputs the driving voltage to the data line DL through the output terminal VOUT and the output control module 464 for loading the image data IMAGE to the data line DL.

Referring to FIG. 4, the output control module 464 is electrically connected to the output stage module 463 through the output terminal VOUT. The output control module 464 is used for establishing or cutting off an electrical connection between the output stage module 463 and the data line DL. During the switching period T1, the output control module 464 cuts off the electrical connection between the output stage module 463 and the data line DL. The auxiliary input stage unit 4611, the gain stage module 462, and the output stage module 463 form a first unity gain amplifier for receiving the gamma voltages from the gamma resistor strings 470. During the stable period T2, the output control module 464 establishes the electrical connection between the output stage module 463 and the data line DL, so as to provide the driving voltages to the data line DL. The main input stage unit 4610, the gain stage module 462, and the output stage module 463 form a second unity gain amplifier for receiving the gamma voltages from the gamma resistor strings 470. In one embodiment, the output control module 464 can be a transmission gate. The output control module 464 can include a fifth switch S5. A control terminal of the fifth switch S5 receives a first output control signal LD. A first connection terminal of the fifth switch S5 is electrically connected to the output terminal VOUT, and a second connection terminal of the fifth switch S5 is electrically connected to the data line DL.

The gamma resistor strings 470 are electrically connected to the gamma correction reference voltage circuit 500 and the DAC circuit 450. The gamma resistor strings 470 provide gamma voltages to the DAC circuit 450. The gamma resistor strings 470 can adjust the gamma voltage based on the gamma correction reference voltage.

Figure 5:
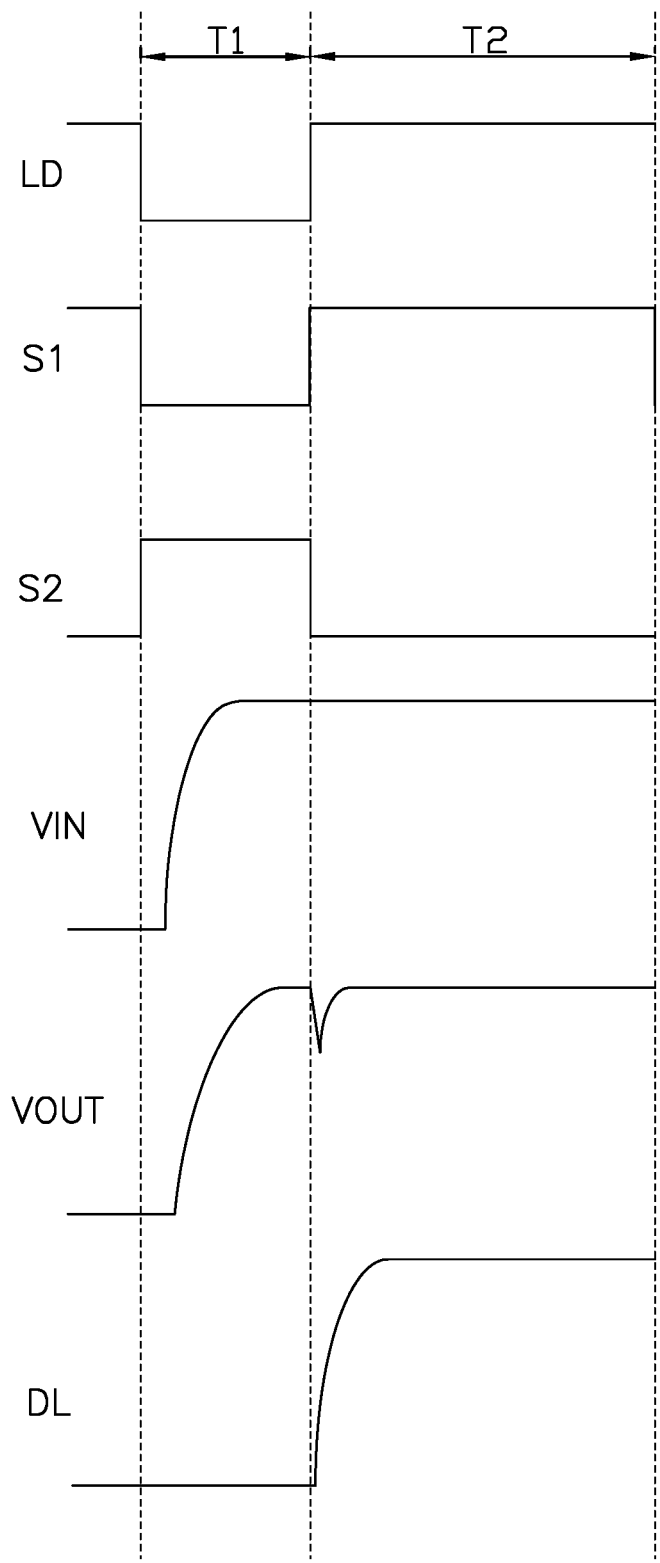
FIG. 5 is a timing diagram showing waveforms of the first output control signal LD, the first switch control signal provided to the first switch, the second switch control signal provided to the second switch, the input terminal VIN, the output terminal VOUT, and the data line DL of FIG. 4 according to the present disclosure.

FIG. 5 shows a timing diagram of the first output control signal LD, the first switch control signal provided to the first switch S1, the second switch control signal provided to the second switch S2, the input terminal VIN, the output terminal VOUT, and the data line DL.

During the switching period T1, the first switch control signal is in the inactive state and the first switch S1 turns off, so as to cut off the electrical connection between the DAC 450 and the main input stage unit 4610. The second switch control signal is in the active state and the second switch S2 turns on, so as to establish the electrical connection between the first input terminal IN1 and the second input terminal IN2. The second input terminal IN2 is electrically connected with the output terminal VOUT of the output stage module 463. The third switch S3 and the fourth switch S4 turn on, so as to establish an electrical connection between the auxiliary input stage unit 4611 and the gain stage module 462. The first unity gain amplifier is formed by the auxiliary input stage unit 4611, the gain stage module 462, and the output stage module 463, so as to output the driving voltage based on the gamma voltage. Since the sizes of the elements of the auxiliary input stage unit 4611 are smaller than the sizes of the elements of the main input stage unit 4610, the driving voltage is quickly provided to the output terminal VOUT. The first output control signal LD is in the inactive state, the output control module 464 cuts off electrical connection between the output stage module 463 and the data line DL.

During the stable period T2, the first switch control signal is in the active state, the first switch S1 turns on, so as to establish the electrical connection between the DAC 450 and the main input stage unit 4610. The second switch control signal is in the inactive state, the second switch S2 turns off, so as to cut off the electrical connection between the first input terminal IN1 and the second input terminal IN2. The third switch S3 and the fourth switch S4 turn off, so as to cut off the electrical connection between the auxiliary input stage unit 4611 and the gain stage module 462. The second unity gain amplifier is formed by the main input stage unit 4610, the gain stage module 462, and the output stage module 463, so as to output the driving voltage based on the gamma voltage. When the first output control signal LD switches to the active state (after the second switch control signal switches to the inactive state), the output control module 464 establishes an electrical connection between the output stage module 463 and the data line DL. In one embodiment, the first switch control signal and the second switch control signal have same pulse width, which can be same as that of the first output control signal LD. Alternatively, the pulse width of the first output control signal LD can be different from the pulse widths of the first switch control signal and the second switch control signal. For example, the pulse width of the first output control signal LD can be larger than the pulse widths of the first switch control signal and the second switch control signal.

Figure 6:
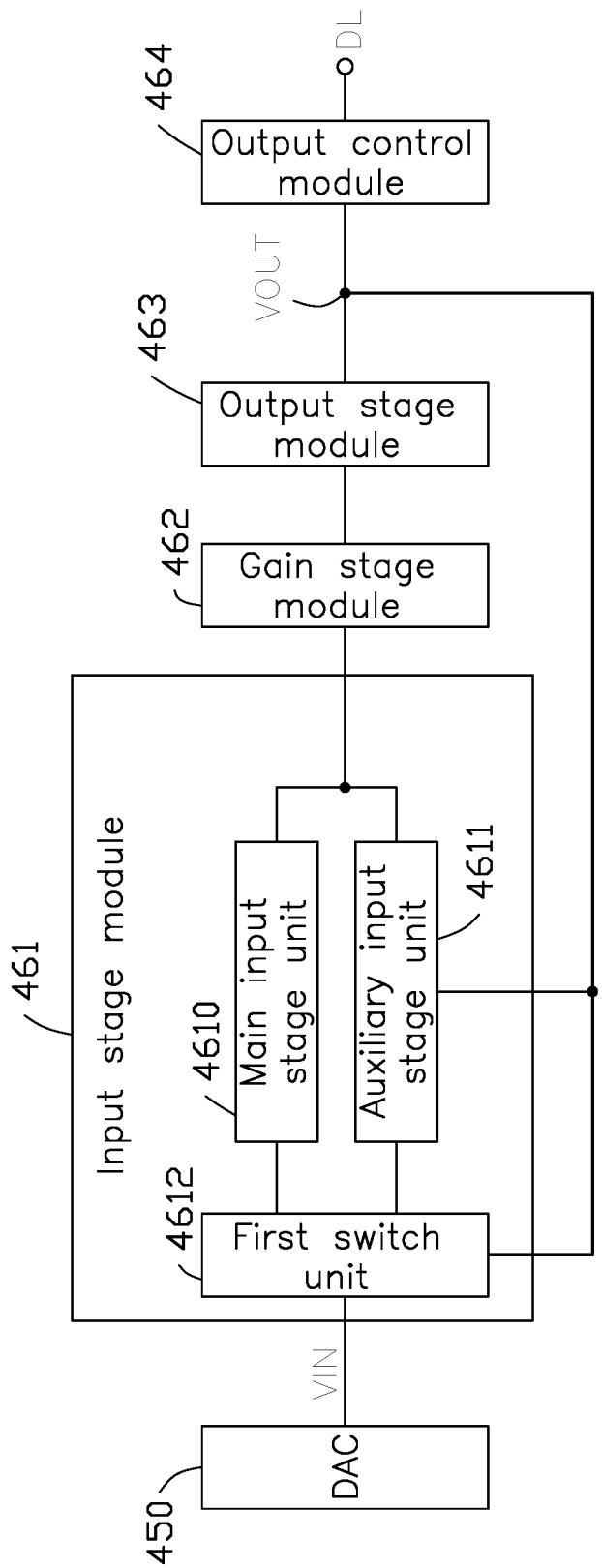
FIG. 6 is a diagram illustrating a second embodiment of an output buffer circuit of the circuit of FIG. 2 according to the present disclosure.
Figure 7:
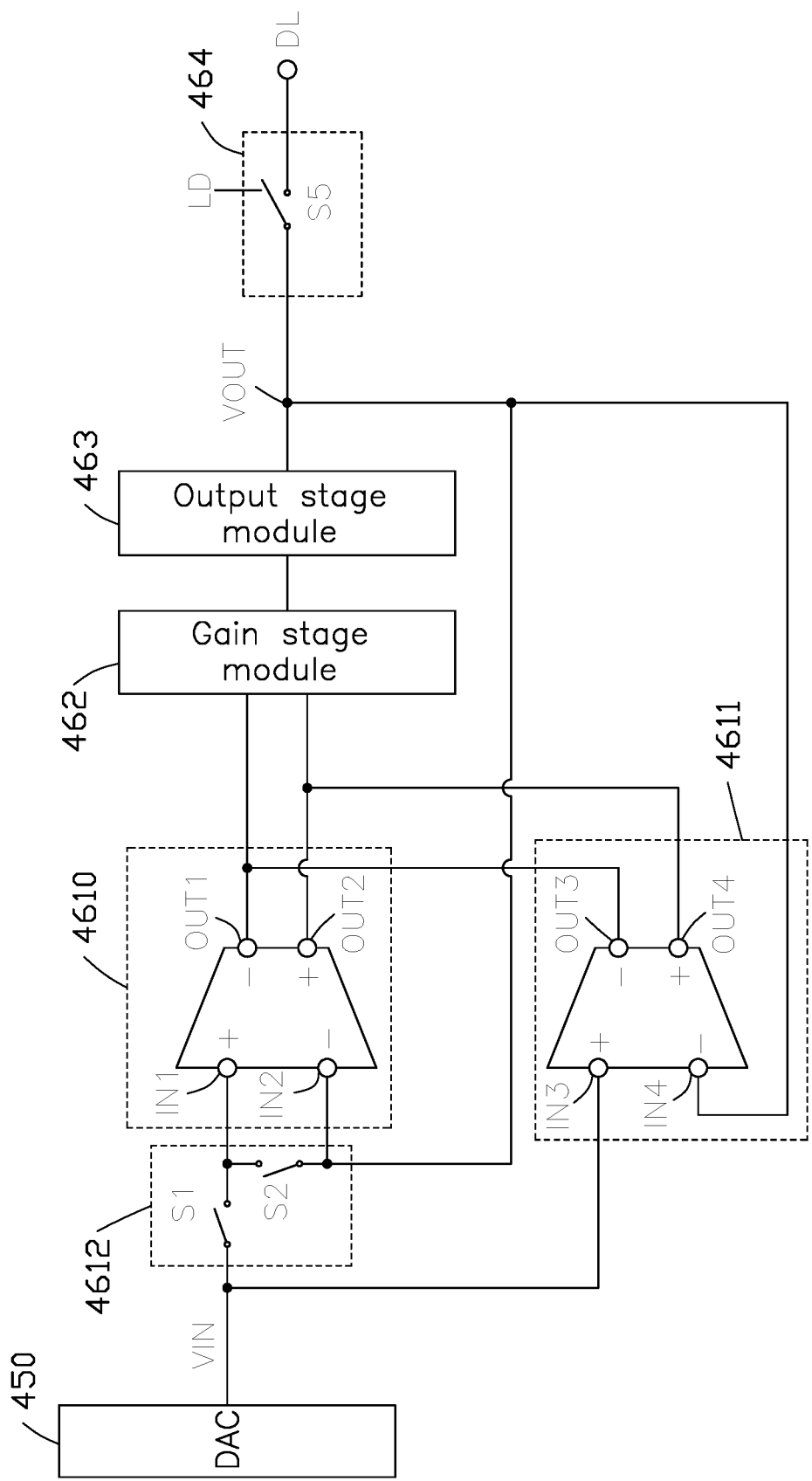
FIG. 7 is a circuit diagram illustrating an embodiment of an input stage module and an output control module of the circuit of FIG. 6 according to the present disclosure.

FIGS. 6 and 7 show a second embodiment of the output buffer circuit 460. The output buffer circuit 460 of the second embodiment is similar to the output buffer circuit 460 of the first embodiment. In other words, the construction of the output buffer circuit 460 in the first embodiment is mostly same as the output buffer circuit 460 in the second embodiment. The difference between the first and second embodiments is that the output buffer circuit 460 of the second embodiment does not have the second switch unit 4613. The main input stage unit 4610 and the auxiliary input stage unit 4611 are electrically and directly connected with the gain stage module 462.

Based on the structure of the source driving circuit 400 and the display device 1, during the switching period T1, the auxiliary input stage unit 4611 with smaller size of elements receives the gamma voltage, so as to reduce parasitic capacitances on the transmitting path of the gamma voltage. Thus, a delay time of the gamma voltage is reduced, and the output slew rate of the output buffer circuit 460 is increased. The output stage module 463 provides driving voltage to the main input stage unit 4610 for pre-charging the parasitic capacitor in the main input stage unit 4610. When switching to the stable period T2, the main input stage unit 4610 receives the gamma voltage. Since the level of driving voltage is close to the gamma voltage level, a re-settling time for the gamma voltage is not needed, and the stability of the source driving circuit 400 is ensured.

Division of the modules herein is a division according to logical functions; other division manners may be adopted during practical implementation. Each function module in each embodiment of the present disclosure may be integrated into a processing module, each module may also exist independently and physically, and two or more than two modules may also be integrated into a module. The above-mentioned integrated module may be implemented in a form of hardware and may also be implemented in forms of hardware and software function module.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A source driving circuit, the source driving circuit receives gamma correction reference voltages from a gamma correction reference voltage circuit, and is electrically connected to data lines; the source driving circuit comprises:
   gamma resistor strings configured to receive the gamma correction reference voltages and generate gamma voltages;
   a digital to analog (DAC) circuit electrically connected to the gamma resistor strings, and configured to select corresponding gamma voltages from the gamma resistor strings based on digital signals; and
   an output buffer circuit configured to receive the gamma voltages and output driving voltages for the data lines, wherein the output buffer circuit comprises an input stage module, a gain stage module, and an output stage module; the input stage module comprises a main input stage unit and an auxiliary input stage unit; sizes of elements in the auxiliary input stage unit are smaller than sizes of elements in the main input stage unit; the input stage module operates in a switching period and a stable period, alternately; during the switching period, the auxiliary input stage unit, the gain stage module, and the output stage module form a first unity gain amplifier for outputting the driving voltages based on the gamma voltages; during the stable period, the main input stage unit, the gain stage module, and the output stage module form a second unity gain amplifier for outputting the driving voltages based on the gamma voltages.

2. The source driving circuit of claim 1, wherein the input stage module comprises a first switch unit and a second switch unit; the main input stage unit is electrically connected to the DAC circuit through the first switch unit; during the switching period, the first switching unit cuts off an electrically connection between the DAC circuit and the main input stage unit; during the stable period, the first switch unit establishes the electrical connection between the DAC circuit and the main input stage unit; the second switch module is electrically connected between the auxiliary input stage unit and the gain stage module; during the switching period, the second switch unit establishes an electrical connection between the auxiliary input stage unit and the gain stage module; during the stable period, the second switch unit cuts off the electrical connection between the auxiliary input stage unit and the gain stage module.

3. The source driving circuit of claim 2, wherein the first switch unit comprises a first switch and a second switch; the main input stage unit comprises a first input terminal and a second input terminal; during the switching period, the first switch cuts off an electrical connection between the first input terminal and the DAC circuit, and the second switch establishes an electrical connection between the first input terminal and the second input terminal; during the stable period, the first switch establishes the electrical connection between the first input terminal and the DAC circuit, and the second switch cuts off the electrical connection between the first input terminal and the second input terminal.

4. The source driving circuit of claim 3, wherein the first switch is controlled by a first switch control signal, the second switch is controlled by a second switch control signal; voltage levels of the first switch control signal and the second switch control signal are opposite in any time point; pulse widths of the first switch control signal and the second switch control signal are substantially same.

5. The source driving circuit of claim 4, wherein the output buffer circuit further comprises an output control module; the output control module establishes or cuts off an electrical connection between the output stage module and the data lines; during the switching period, the output control module cuts off the electrical connection between the output stage module and the data lines; during the stable period, the output control module establishes the electrical connection between the output stage module and the data lines.

6. The source driving circuit of claim 5, wherein the output control module comprises a fifth switch; a control terminal of the fifth switch receives a first output control signal; a first connection terminal of the fifth switch is electrically connected to the output terminal of the output stage module, and a second connection terminal of the fifth switch is electrically connected to the data lines.

7. The source driving circuit of claim 6, wherein the fifth switch is controlled by the first output control signal; the first output control signal switches from an inactive state to an active state after the second switch control signal switches to the inactive state.

8. The source driving circuit of claim 1, wherein the sizes of elements in the main input stage unit are N times larger than the sizes of elements in the auxiliary input stage unit; N is an integer or not an integer.

9. A display device comprises a plurality of scan lines and a plurality of data lines which are intersected and insulated with each other; the display device further comprises:
  a gamma correction reference voltage circuit, configured to output gamma correction reference voltage based on a gamma correction curve; and
  a source driving circuit configured to convert digital signal into driving voltages; the source driving circuit comprises:
    gamma resistor strings configured to receive the gamma correction reference voltages and generate gamma voltages;
    a digital to analog (DAC) circuit electrically connected to the gamma resistor strings, and configured to select corresponding gamma voltages from the gamma resistor strings based on digital signals; and
    an output buffer circuit configured to receive the gamma voltages and output driving voltages, wherein the output buffer circuit comprises an input stage module, a gain stage module, and an output stage module; the input stage module comprises a main input stage unit and an auxiliary input stage unit; sizes of elements in the auxiliary input stage unit are smaller than sizes of elements in the main input stage unit; the input stage module operates in a switching period and a stable period, alternately; during the switching period, the auxiliary input stage unit, the gain stage module, and the output stage module form a first unity gain amplifier for outputting the driving voltages based on the gamma voltages; during the stable period, the main input stage unit, the gain stage module, and the output stage module form a second unity gain amplifier for outputting the driving voltages based on the gamma voltages.

10. The display device of claim 9, wherein the input stage module comprises a first switch unit and a second switch unit; the main input stage unit is electrically connected to the DAC circuit through the first switch unit; during the switching period, the first switching unit cuts off an electrically connection between the DAC circuit and the main input stage unit; during the stable period, the first switch unit establishes the electrical connection between the DAC circuit and the main input stage unit; the second switch module is electrically connected between the auxiliary input stage unit and the gain stage module; during the switching period, the second switch unit establishes an electrical connection between the auxiliary input stage unit and the gain stage module; during the stable period, the second switch unit cuts off the electrical connection between the auxiliary input stage unit and the gain stage module.

11. The display device of claim 10, wherein the first switch unit comprises a first switch and a second switch; the main input stage unit comprises a first input terminal and a second input terminal; during the switching period, the first switch cuts off an electrical connection between the first input terminal and the DAC circuit, and the second switch establishes an electrical connection between the first input terminal and the second input terminal; during the stable period, the first switch establishes the electrical connection between the first input terminal and the DAC circuit, and the second switch cuts off the electrical connection between the first input terminal and the second input terminal.

12. The display device of claim 11, wherein the first switch is controlled by a first switch control signal, the second switch is controlled by a second switch control signal; voltage levels of the first switch control signal and the second switch control signal are opposite in any time point; pulse widths of the first switch control signal and the second switch control signal are substantially same.

13. The display device of claim 12, wherein the output buffer circuit further comprises an output control module; the output control module establishes or cuts off an electrical connection between the output stage module and the data lines; during the switching period, the output control module cuts off the electrical connection between the output stage module and the data lines; during the stable period, the output control module establishes the electrical connection between the output stage module and the data lines.

14. The display device of claim 13, wherein the output control module comprises a fifth switch; a control terminal of the fifth switch receives a first output control signal; a first connection terminal of the fifth switch is electrically connected to the output terminal of the output stage module, and a second connection terminal of the fifth switch is electrically connected to the data lines.

15. The display device of claim 14, wherein the fifth switch is controlled by the first output control signal; the first output control signal switches from an inactive state to an active state after the second switch control signal switches to the inactive state.

16. The display device of claim 9, wherein the sizes of elements in the main input stage unit are N times larger than the sizes of elements in the auxiliary input stage unit; N is an integer or not an integer.

17. A source driving circuit, the source driving circuit receives gamma correction reference voltages from a gamma correction reference voltage circuit, and is electrically connected to data lines; the source driving circuit comprises:
  gamma resistor strings configured to receive the gamma correction reference voltages and generate gamma voltages;
  a digital to analog (DAC) circuit electrically connected to the gamma resistor strings, and configured to select corresponding gamma voltages from the gamma resistor strings based on digital signals; and
  an output buffer circuit configured to receive the gamma voltages and output driving voltages for the data lines, wherein the output buffer circuit comprises an input stage module, a gain stage module, and an output stage module; the input stage module comprises a main input stage unit and an auxiliary input stage unit; sizes of elements in the auxiliary input stage unit are smaller than sizes of elements in the main input stage unit; the input stage module operates in a switching period and a stable period, alternately; during the switching period, the auxiliary input stage unit, the gain stage module, and the output stage module form a first unity gain amplifier for outputting the driving voltages based on the gamma voltages; during the stable period, the main input stage unit, the auxiliary input stage unit, the gain stage module, and the output stage module form a second unity gain amplifier for outputting the driving voltages based on the gamma voltages; output terminals of the auxiliary input stage unit are directly connected with the gain stage module.

18. The source driving circuit of claim 17, wherein the input stage module comprises a first switch unit; the main input stage unit is electrically connected to the DAC circuit through the first switch unit; during the switching period, the first switching unit cuts off an electrically connection between the DAC circuit and the main input stage unit;

during the stable period, the first switch unit establishes the electrical connection between the DAC circuit and the main input stage unit.

19. The source driving circuit of claim 18, wherein the first switch unit comprises a first switch and a second switch; the main input stage unit comprises a first input terminal and a second input terminal; during the switching period, the first switch cuts off an electrical connection between the first input terminal and the DAC circuit, and the second switch establishes an electrical connection between the first input terminal and the second input terminal; during the stable period, the first switch establishes the electrical connection between the first input terminal and the DAC circuit, and the second switch cuts off the electrical connection between the first input terminal and the second input terminal.

20. The source driving circuit of claim 19, wherein the first switch is controlled by a first switch control signal, the second switch is controlled by a second switch control signal; voltage levels of the first switch control signal and the second switch control signal are opposite in any time point; pulse widths of the first switch control signal and the second switch control signal are substantially same.

* * * * *